United States Patent
El Mernissi et al.

(10) Patent No.: US 10,733,517 B2
(45) Date of Patent: Aug. 4, 2020

(54) DECISION SERVICE

(71) Applicant: INTERNATIONAL BUSINESS MACHINES CORPORATION, Armonk, NY (US)

(72) Inventors: Karim S. El Mernissi, Noisy-le-Grand (FR); Pierre D. Feillet, Gentilly (FR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 927 days.

(21) Appl. No.: 15/260,077

(22) Filed: Sep. 8, 2016

(65) Prior Publication Data

US 2017/0286844 A1    Oct. 5, 2017

(30) Foreign Application Priority Data

Apr. 5, 2016 (GB) .................................. 1605815.8

(51) Int. Cl.
  *G06N 5/04*    (2006.01)
  *G06Q 10/06*    (2012.01)
  *G06F 16/903*    (2019.01)
  *G06N 5/02*    (2006.01)

(52) U.S. Cl.
  CPC ....... *G06N 5/045* (2013.01); *G06F 16/90335* (2019.01); *G06Q 10/0637* (2013.01); *G06N 5/02* (2013.01); *G06N 5/022* (2013.01); *G06N 5/025* (2013.01); *G06N 5/04* (2013.01)

(58) Field of Classification Search
  CPC .......... G06N 5/02; G06N 5/022; G06N 5/025; G06N 5/04; G06N 5/045; G06F 16/90335; G06Q 10/0637

USPC .......................................................... 706/11
See application file for complete search history.

(56) References Cited

U.S. PATENT DOCUMENTS

| | | | |
|---|---|---|---|
| 5,408,587 A | 4/1995 | Maier et al. | |
| 6,631,361 B1 | 10/2003 | O'Flaherty et al. | |
| 8,180,718 B2 | 5/2012 | Bethke et al. | |
| 8,510,149 B1 | 8/2013 | He et al. | |
| 2006/0248178 A1* | 11/2006 | Thieret | G06N 5/025 709/223 |
| 2015/0019470 A1 | 1/2015 | Park et al. | |
| 2015/0142699 A1 | 5/2015 | Rajesh | |

OTHER PUBLICATIONS

Clancy, William J., "The Advantages of Abstract Control Knowledge in Expert System Design", Stanford Computer Science Department technical reports, Nov. 1983, pp. 1-18.

(Continued)

*Primary Examiner* — Shane D Woolwine
(74) *Attorney, Agent, or Firm* — Tutunjian & Bitetto, P.C.; Scott Dobson

(57) ABSTRACT

A computer implemented method comprising accessing a decision service, determining a subset of the decision logic, inserting a causal probe into the decision service, receiving a query at the interface of the decision service, executing the decision logic to determine the one or more outputs for the decision service for the received query, and outputting the one or more outputs and the causal history from the decision service for the received query. The causal history can be accessed at a later date and used to generate a causal model that can be used to determine an explanation for the original decision.

15 Claims, 14 Drawing Sheets

(56) References Cited

OTHER PUBLICATIONS

Neches et al., "Explainable (and Maintainable) Expert Systems", In Proc. Cognitiva 1987, May 1987, pp. 219-224.
Scott et al, "Methods for Generating Explanations", In Rule-Based Expert Systems: The MYCIN Experiments of the Stanford Heuristic Programming Project edited by Buchanan-Shortliffe Chapter 18, 1984, pp. 338-362.
Shortliffe et al., "Explanation as a topic of AI Research", In Rule-Based Expert Systems: The MYCIN Experiments of the Stanford Heuristic Programming Project edited by Buchanan-Shortliffe chapter 17, 1984, pp. 330-337.
Swartout, William R., "XPLAIN: A System for Creating and Explaining Expert Consulting Programs", Jul. 1983, pp. 1-56.
Giorgio, "Problem Solving and Truth Maintenance Systems", pp. 1-8, Available at https://cis.temple.edu/~giorgio/cis587/readings/tms.html, downloaded Jun. 15, 2017.
Herlocker et al., "Explaining Collaborative Filtering Recommendations", In CSCW '00 Porceedings of the ACM conference on Computer supported cooperative work, Dec. 2000, pp. 241-250.

\* cited by examiner

POSSIBLE ELIGIBILITY RELATIONSHIPS

------▶ COMPUTATION RELATIONSHIP

⎯⎯⎯▶ ELIGIBILITY RELATIONSHIP

—·—·—▶ INELIGIBILITY RELATIONSHIP

| Cause | Data effect | Eligibility effect |
|---|---|---|
| Initialization | W = FALSE X = TRUE<br>Y = 5 | X == TRUE → add Rule A<br>Y < 10 → add Rule B.ELSE |
| Rule A executed | Y = Y+5 = 10<br>Z = 10 | Y >= 10 → add Rule B<br>→ add Rule D<br>→ remove Rule B.ELSE |
| Rule B executed | Z = Y+10 = 20 | Z >= 20 → add Rule C |
| Rule C executed | Z = Z*2 = 40<br>W = TRUE | None |
| Rule D executed | W = TRUE or FALSE<br>= TRUE | None |

Fig. 8

| Cause | Data effect | Eligibility effect |
|---|---|---|
| Initialization | X = TRUE<br>Y = 5 | X == TRUE → add Rule A<br>Y < 10 → add Rule B.ELSE |
| Rule A executed | Y = Y+5 = 10<br>Z = 10 | Y >= 10 → add Rule B<br>→ remove Rule B.ELSE |
| Rule B executed | Z = Y+10 = 20 | Z >= 20 → add Rule C |
| Rule C executed | Z = Z*2 = 40 | None |

Fig. 9

DECISION SERVICE

BACKGROUND

The present invention relates to a computer implemented method, a computer system and a computer program product for deploying and operating an improved decision service.

SUMMARY

According to a first aspect of the present invention, there is provided a computer implemented method comprising accessing a decision service, the decision service comprising (a) an interface defining one or more inputs and one or more outputs and (b) a decision logic comprising a plurality of statements, each statement defining a cause and one or more effects that follow if the cause is satisfied, determining a subset of the decision logic, the subset comprising only those components of the decision logic required to determine the output(s) for the decision service, inserting a causal probe into the decision service, the causal probe comprising recording logic arranged to record a causal history for a query to the decision service, the causal history limited to the components of the decision logic forming the subset of the decision logic required to determine the output(s) for the decision service, receiving a query at the interface of the decision service, the query defining the one or more inputs for the decision service, executing the decision logic to determine the one or more outputs for the decision service for the received query, the executing including executing the causal probe to determine the causal history for the received query, and outputting the one or more outputs and the causal history from the decision service for the received query.

According to a second aspect of the present invention, there is provided a computer system comprising a processor arranged to access a decision service, the decision service comprising (a) an interface defining one or more inputs and one or more outputs and (b) a decision logic comprising a plurality of statements, each statement defining a cause and one or more effects that follow if the cause is satisfied, determine a subset of the decision logic, the subset comprising only those components of the decision logic required to determine the output(s) for the decision service, inserting a causal probe into the decision service, the causal probe comprising recording logic arranged to record a causal history for a query to the decision service, the causal history limited to the components of the decision logic forming the subset of the decision logic required to determine the output(s) for the decision service, receive a query at the interface of the decision service, the query defining the one or more inputs for the decision service, execute the decision logic to determine the one or more outputs for the decision service for the received query, the executing including executing the causal probe to determine the causal history for the received query, and output the one or more outputs and the causal history from the decision service for the received query.

According to a third aspect of the present invention, there is provided a computer program product for controlling a system, the computer program product comprising a computer readable storage medium having program instructions embodied therewith, the program instructions executable by a processor to cause the processor to access a decision service, the decision service comprising (a) an interface defining one or more inputs and one or more outputs and (b) a decision logic comprising a plurality of statements, each statement defining a cause and one or more effects that follow if the cause is satisfied, determine a subset of the decision logic, the subset comprising only those components of the decision logic required to determine the output(s) for the decision service, inserting a causal probe into the decision service, the causal probe comprising recording logic arranged to record a causal history for a query to the decision service, the causal history limited to the components of the decision logic forming the subset of the decision logic required to determine the output(s) for the decision service, receive a query at the interface of the decision service, the query defining the one or more inputs for the decision service, execute the decision logic to determine the one or more outputs for the decision service for the received query, the executing including executing the causal probe to determine the causal history for the received query, and output the one or more outputs and the causal history from the decision service for the received query.

BRIEF DESCRIPTION OF THE DRAWINGS

Preferred embodiments of the present invention will now be described, by way of example only, with reference to the following drawings, in which:

FIG. 8 is a table showing an operation of a decision service at runtime, FIG. 9 is a table similar to FIG. 8 showing a minimal operation of a decision service at runtime.

DETAILED DESCRIPTION

Figure 1:
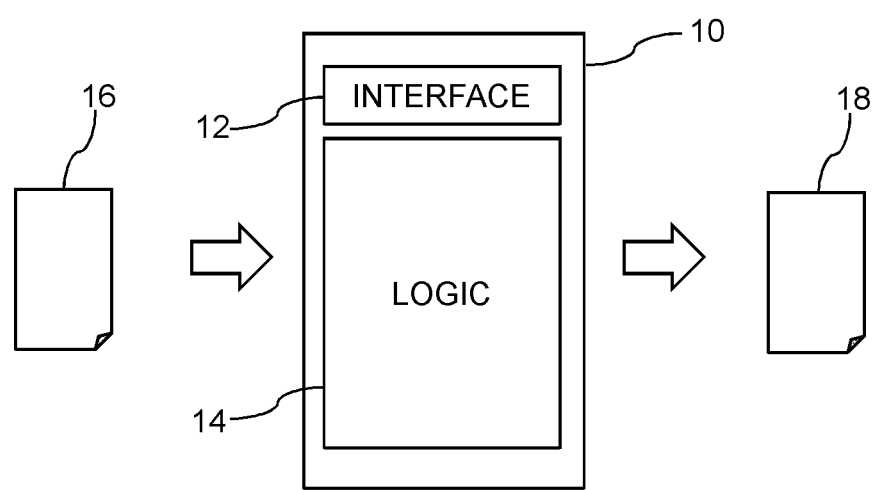
FIG. 1 is a schematic diagram of a decision service.

FIG. 1 shows a decision service 10. The decision service 10 comprises an interface 12 defining one or more inputs and one or more outputs and decision logic 12, which comprises a plurality of statements, each statement defining a cause and one or more effects that follow if the cause is satisfied. The decision logic 12 is preferably expressed as a set of rules that take the form of logical (Boolean) statements that can be used to process the input(s) and produce the output(s). A query 16 is provided to the decision service 10 and an output 18 (a decision) is generated from an execution of the decision logic 14 that processes the query 16.

The decision service 10 can be used in many business environments where an answer is required to a query 16. For example, the decision service 10 could be one that is used by a mortgage provider to determine whether an applicant for a mortgage is successful, when taking into account various input factors relating to the applicant, such as their age, their income, the price of the property being purchased and so on. The input factors are specified in the query 16 according to the terms of the inputs defined by the interface 12. By supplying the query 16 to the decision service 10, the mortgage provider is able to generate a decision 18 for an applicant as to whether their mortgage application will be accepted or not.

The output 18 of the decision service 10 may not be a simple yes or no; the decision service 10 may also provide more complex outputs 18. For example, the output 18 that is generated in the case of a mortgage application could also include information about the terms of the mortgage, if the application is successful. The business logic that is expressed by the decision logic 14 can state other information such as the products that are available to the applicant and information such as redemption penalties that might apply and so on. The decision service 10 is built using business analysts and software engineers (and/or using machine learning) to represent the decision logic 14 that applies to return a decision response 18 for a decision query 16.

A decision 18 that is produced by the decision service 10 is provided to a user of the decision service 10 in response to a query 16 submitted by the user, which is normally submitted on behalf of a third party, such as a mortgage consultant submitting a customer's mortgage application. Although the user of the decision service 10 understands the nature of the input 16 to and the output 18 from the decision service 10, the actual reasoning that produces the specific decision 18 may not be immediately clear. Indeed in many complex decision services, it is very likely that the user, even despite their training and experience, will not be able to explain why the output 18 is as it is.

For example, a mortgage consultant may gather the necessary information from a customer that enables the consultant to submit a query 16 to the decision service 10 and receive the decision 18, however if the decision 18 is to decline the customer's mortgage application, then the consultant may not be able to immediately explain why the decision 18 is negative. Decisions made need to be explainable for business purposes and also frequently for regulatory purposes. For this reason, information about the operation of the decision service 10 in response to a specific query 16 needs to be captured and stored, so that an explanation of the decision 18 can be generated either immediately or at some future time.

Figure 2:
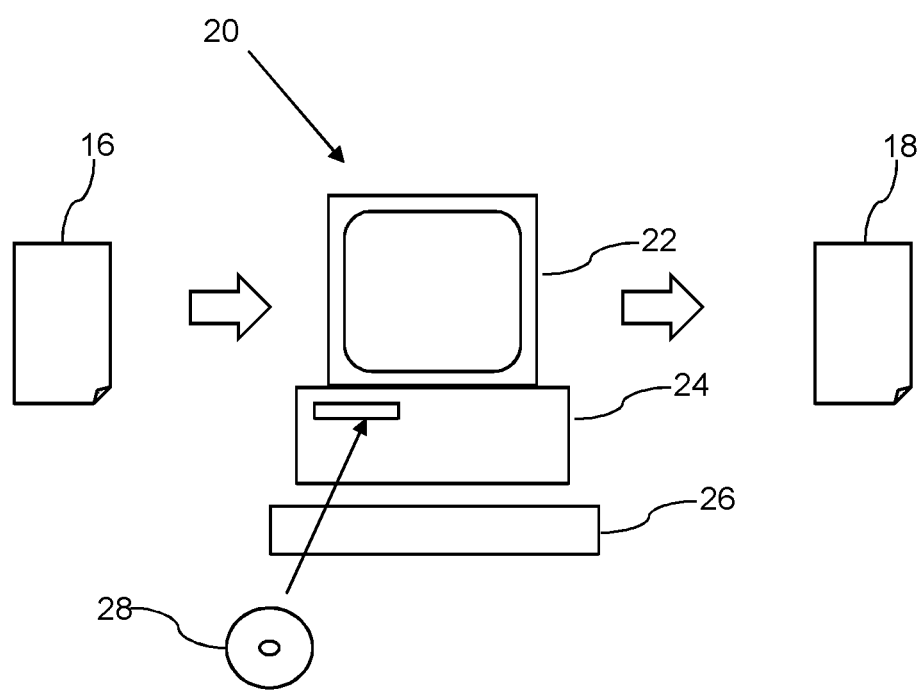
FIG. 2 is a schematic diagram of a computer system.

FIG. 2 shows a computer system 20 that can be used to operate the decision service 10. The computer system 20 comprises a display device 22, a processor 24 and a user input device 26. A computer program product is provided that is stored on a computer readable medium 28, here a CD-ROM 28. The computer program product comprises a set of instructions that are used to control the processor 24. The processor 24 executes the instructions from the computer program product in order to operate the decision service 10. The computer system 20 shown here is a desktop computer; however the functionality provided by the computer system 20 can also be delivered by a remote server that comprises a set of distributed components. The computer system 20 addresses needs in the area of decision management, specifically in the context of an automated decision service 10. Decision automation speeds up business and delivers reliable outcomes. The current trend is to increase the number of computer based decisions. Decision services already handle complex logic in a millisecond timeframe. It is anticipated that there will be an acceleration of computer based decisions with Analytics, Big Data, and Internet of Things growth perspectives. While decision automation becomes increasingly large, optimisation and regulation of these decisions 18 requires a method to explain them. Two parties at least are targeted in decision explanation, firstly an end user, who applies and receives the outcome, whose main objective is to improve their acceptance of the decision and secondly a business analyst, who models and authors the decision logic 14 to operate a corporate policy, whose main goal is to improve the decision logic 14.

Trust in a decision service 10 is generated not only by the quality of the result, but also by a clear description of how a result was obtained. An explanation can be required for regulation or to make better decisions in the future. While implementations using business rules provide transparency of the decision logic 14 they partially solve the challenge to produce an explanation. Traditional methods for explaining decisions provide explanations by converting the code of the decision logic 14 or traces of its execution to English or another natural language. While such methods may adequately explain program behaviour (how), they typically cannot provide justifications for that behaviour. An explanation requires knowledge that was used to produce or run the decision logic 14 but is itself not recorded as part of the decision logic 14. Programming models as business rules succeed in capturing an expert knowledge however this knowledge has to be articulated and extended to produce an explanation suitable for end users and business analysts.

The system 20 uses a pre-processing pass on the decision service 10 to analyse and retain the portion of the decision logic 14 that is needed in an explanation process. The system 20 statically analyses the decision service 10 as defined by its integration interface 12 and decision logic 14. Through this pre-processing pass, the system 20 retains only the portion of classes, parameters, sources of cause and effects which are actually needed in making a decision 18, producing a reduced decision causal model and causal history, and enabling explanation support on demand, to minimize the runtime performance penalty for all the decisions operated by the decision service 10. The system 20 limits the causal model to data and logical statements that link the input 16 to the output 18 of the decision service 10.

Figure 3:
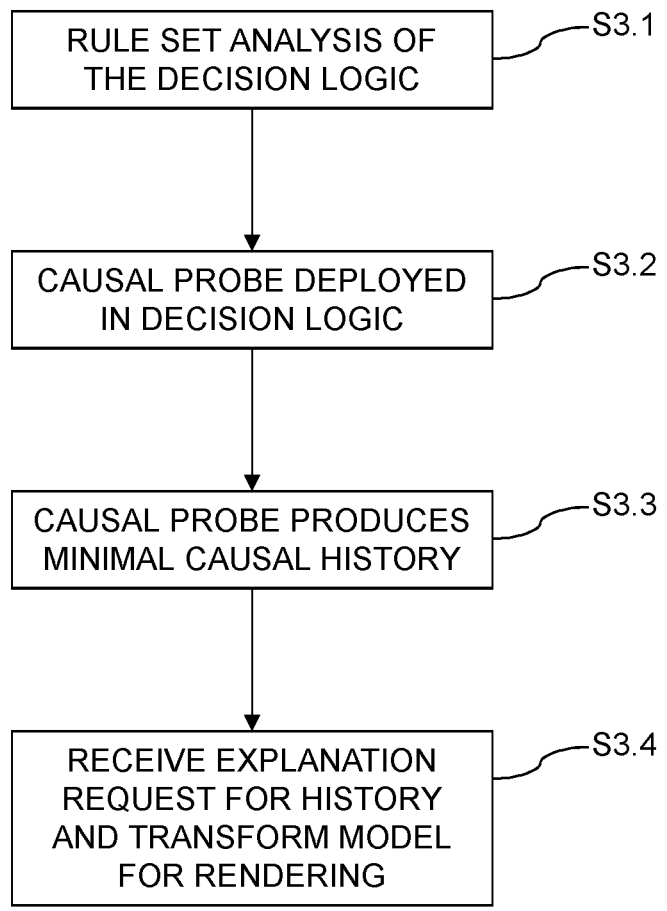
FIG. 3 is a flowchart of a method of operating the decision service.

FIG. 3 shows a flowchart showing the process stages in the handling of the decision service 10. The business rules implementing the decision logic 14 are statically analysed to determine a minimal causal model that is fed when a decision 18 is operated, and leveraged to produce material for an explanation on demand after that decision has occurred. The four stages in the process are: step S3.1 authoring, step S3.2 deployment, step S3.3 execution and step S3.4 post-execution. In the authoring stage S3.1, the decision logic 14 of the decision service 10 is analysed to determine from its signature and implementation those parts of the decision logic 14 that need to be instrumented for the explanation. In the deployment stage S3.2, a causal probe is deployed with the decision logic 14 of the decision service 10. The probe instruments the decision logic 14 without altering the logic 14. The probe is implemented as a plug-in that listens selectively to decision logic events that are relevant to the specific minimal causal model of the decision service 10. In the execution phase S3.3, the decision logic 14 is run by the decision service 10 which integrates the causal probe into the operation of the decision logic 14 to produce a minimal execution history. In the post-execution phase S3.4, when an explanation request is received, the system 20 can transform the minimal causal model for rendering into an explanation based on the material (the reduced causal history) that has been captured.

A decision service causal model is a graph composed of intrinsic and extrinsic causal relationships. Intrinsic causal relationships represent the explicit statements in each decision component, usually an IF THEN or IF THEN ELSE rule. Extrinsic causal relationships represent dependencies between two decision components (such as rules) and can be eligibility relationships, ineligibility relationships or computation relationships.

In relation to a decision of a decision service, a decision causal history is a sequence of causal links, where a causal link is an instance of a causal relationship, which contains information about the causal relationship such as parameter values and so on. A decision causal model is a graph of causal links that respects the causal relationship model.

An example of a causal intrinsic relationship is a rule that defines an explicit cause to effect relationship. If a rule is of the following form:

IF $T<10$ and $X>0$ THEN $Y=8, Z=10$ then the data tested in the condition part of the rule are intrinsic causes of the data values set in the action part of the rule and this business rule describes explicitly the following relationships: data T is an intrinsic cause of data Y, data T is an intrinsic cause of data Z, data X is an intrinsic cause of data Y and data X is an intrinsic cause of data Z.

An example of an eligibility relationship would relate to two rules where the first rule tests variables W and X and performs actions on variables Y and T and the second rule tests variables T and X and performs actions on variables Y and Z. In this example the first rule affects the eligibility of the second rule through a data change. An action of the first rule modifies the value of T used as a condition in the second rule. An eligibility relationship is one where an action of one rule causes a later rule to be performed, which otherwise would not have been performed (changing the input condition of the later rule from false to true). An ineligibility relationship has the opposite effect, where the action of a first rule would cause a second rule not to be performed, when it would have been performed (changing the input condition of the later rule from true to false). A computation relationship occurs between two rules when a first rule contributes to the value of a variable computed by a second rule but has no effect on the eligibility of the second rule. For example a first rule may have an action that sets a variable Z to 3. A second rule may have an action that sets Y to 8+Z. In this case a computation relationship exists between the rules, since the setting of Z to 3 in the first rule affects the output of the variable Y in the second rule.

An example of a decision service 10 would have an interface 12 that comprises (Input W, Input X, Input Y, Output Z) thereby defining three input parameters and one output parameter and have decision logic 14 that comprises four rules as follows:

Rule A: IF X==TRUE THEN Y=Y+5; Z=10
Rule B: IF Y>=10 THEN Z=Y+10 ELSE Z=Y
Rule C: IF Z>=20 THEN Z=Z*2; W=TRUE
Rule D: IF Y>=10 THEN W=X or W The rules comprise a plurality of statements where each statement defines a cause and one or more effects that follow if the cause is satisfied. This example of a decision service 10 is obviously a very simple example and is intended to illustrate the processing steps show in FIG. 3 that are carried out by the processor 24 of the computer system 20 in order to provide an explanation of a decision reached by the decision service 10, when that explanation is required.

As described above, the method overview comprises firstly building and reducing a decision service causal model by analysing the decision service 10 to build a decision service causal model and reducing the decision service causal model based on a "path-to-goal" analysis. This is followed by deploying a causal probe within the decision service 10. At runtime (when a query 16 is supplied to the decision service 10 for processing to produce a decision 18) there is generated a reduced causal history and this reduced causal history can then be used to build a decision causal model at post-runtime. The decision logic 14 of the decision service 10 is statically processed in order to deduce only those components that are needed to generate the decision 18 and these are used to build the causal probe that captures the necessary information at runtime when a decision 18 is being generated by the decision service 10.

A two stage process is preferably used when determining the subset of the decision logic 14, where this subset comprises only those components of the decision logic 14 that are required to determine the output 18 of the decision service 10. This two stage process is firstly to transform the rules of the decision logic 14 into a model and then secondly to reduce that model to remove inessential elements within that model. The processor 24 of the computer system 20 must analyse the decision service 10 to build and reduce the decision service causal model.

Building the decision service causal model comprises three sub-stages. Sub-stage 1 comprises building causal eligibility relationships by listing candidates for eligibility relationships evaluation by analysing rule conditions and rule actions, evaluating each candidate of this list and removing those that do not satisfy an eligibility causality evaluation function and building the causal eligibility relationships for the candidates who satisfied the eligibility causality evaluation function. Each candidate can be expressed as a tuple of the following structure: (rule action a, rule condition b, variable involved c). Sub-stage 1 also comprises considering ineligibility relationships in the same way, by listing candidates and evaluating those candidates. Sub-stage 2 comprises building the causal computation relationships, which comprises analysing rule actions and building computation relationships based on variables modification and utilization in actions. Sub-stage 3 comprises building the causal intrinsic relationships, which are those relationships that are already explicitly given by rules and are useful to connect rules to variables in the causal model.

Reducing the decision service causal model also comprises three sub-stages. Sub-stage 1 comprises making a goals list by adding primary goals to the goals list such as output variables and this list can be reduced by using annotations that specify if some output variables can be removed from primary goals. An administrator of the decision service 10 can provide input for this step, where the administrator has the possibility to annotate some parameters as useful or not useful for an explanation, these parameters will be kept or removed from the goals list as appropriate. These annotations help to reduce the cost in CPU and memory at execution of the decision service 10 and the size of the reduced causal model will be smaller. Sub-stage 1 also comprises adding secondary goals to the goals list, for example relating to rules with actions which modify a primary goal. Sub-stage 2 comprises deleting elements with no path to any element of the goals list and sub-stage 3 comprises ensuring that the reduced decision service model is obtained when each element of the model has a path to at least one goal.

Figure 4:
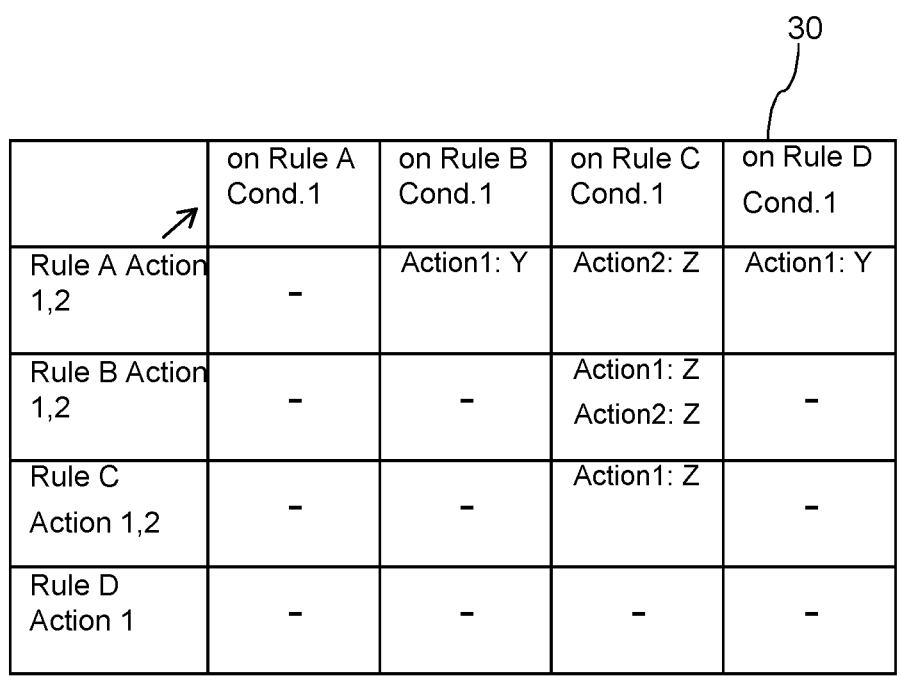
FIG. 4 is a table of candidates for eligibility relationships between rules of the decision service.

Referring to the first sub-stage of the building of a decision service causal model, this comprises building causal eligibility relationships. FIG. 4 illustrates a table 30 that has been generated by the processor 24 from the four rules listed above that define an example decision logic 14 of a decision service 10. Each row of the table 30 is populated by an individual rule on its output side (actions) of the decision logic 14 and the columns represent the rules on their input side (conditions). For example, rule A has a single condition on the input side (IF X==TRUE) which defines the leftmost column and rule A has two actions on the output side (Y=Y+5; Z=10) which defines the top row of the table 30.

Entries within the table 30 define where rules interact with one another, so that an output from one rule triggers the action of a different rule. For example, action 1 from rule A modifies the value of y and therefore generates two entries in the table 30, for the input side of rules B and D. The purpose of generating the table 30 is to identify good candidates for eligibility relationships and all rules pairings where there is no relationship between the inputs (conditions) and outputs (actions) are not considered. A subset of the candidates list is generated by the six entries within the table 30. These six candidates can be expressed as follows:
Candidate 1: (RuleA.Action1,RuleB.Condition1,Y)
Candidate 2: (RuleA.Action2,RuleC.Condition1,Z)
Candidate 3: (RuleA.Action1,RuleD.Condition1,Y)
Candidate 4: (RuleB.Action1,RuleC.Condition1,Z)
Candidate 5: (RuleB.Action2,RuleC.Condition1,Z)
Candidate 6: (RuleC.Action1,RuleC.Condition1,Z)

The six candidates generated from the table 30 must now be evaluated. The aim of the evaluation is to evaluate the six candidates and build causal eligibility relationships based on an eligibility causality function. Each candidate is tested with the function to determine whether the rule action in question can change a rule condition (of a different rule) state from false to true. If the candidate rule action is evaluated to be true by the function, then the candidate rule action is added to a list of eligibility causal relationships.

Consider the first candidate in the list of rule actions above. Given the domain values of the inputs and outputs of the decision service 10 as X and W can be true or false, Y can be from 0 to 100 and Z can be from −30 to 90 (all of which will be defined in the interface 12), then a suitable eligibility function will determine that the first candidate (RuleA.Action1,RuleB.Condition1,Y) will indeed define a causal eligibility relationship for the values of y from 5 to 9 in relation to the action 1 of rule A. These are the only values of y that change the condition of the rule B. This can be seen from the consideration of the actual content of the rules in question. The action 1 of rule A is to increase the value of Y by 5 and the condition 1 of rule B is to check whether Y>=10, the action 1 of rule A changes the condition of rule B when Y has a value from 5 to 9 prior to being operated on by rule A. Working through all of the candidates in the same way leads to candidates 1 and 3 to 5 being kept as causal eligibility relationships and candidates 2 and 6 being rejected.

Candidate 2 is not accepted as an eligibility relationship even though action2 of rule A refers to Z and a condition of rule C relates to Z. This is because the action2 of rule A sets Z=10 and the input test of rule C states "IF Z>=20" and it can clearly be seen that rule C will never be triggered by rule A, with respect to the variable Z. Candidate 6 is not accepted as an eligibility relationship as this candidate refers to rule C where the condition is "Z>=20" and the action is "Z=Z*2". Since an eligibility relationship occurs when an input condition is changed from false to true it can be seen that this would never happen as the action (Z=Z*2) only occurs if the value of Z is already greater than or equal to 20 and so the action cannot change the condition from false to true. There is no value of Z that would change the input condition from false to true in the context of this condition and action sequence.

Figure 5:
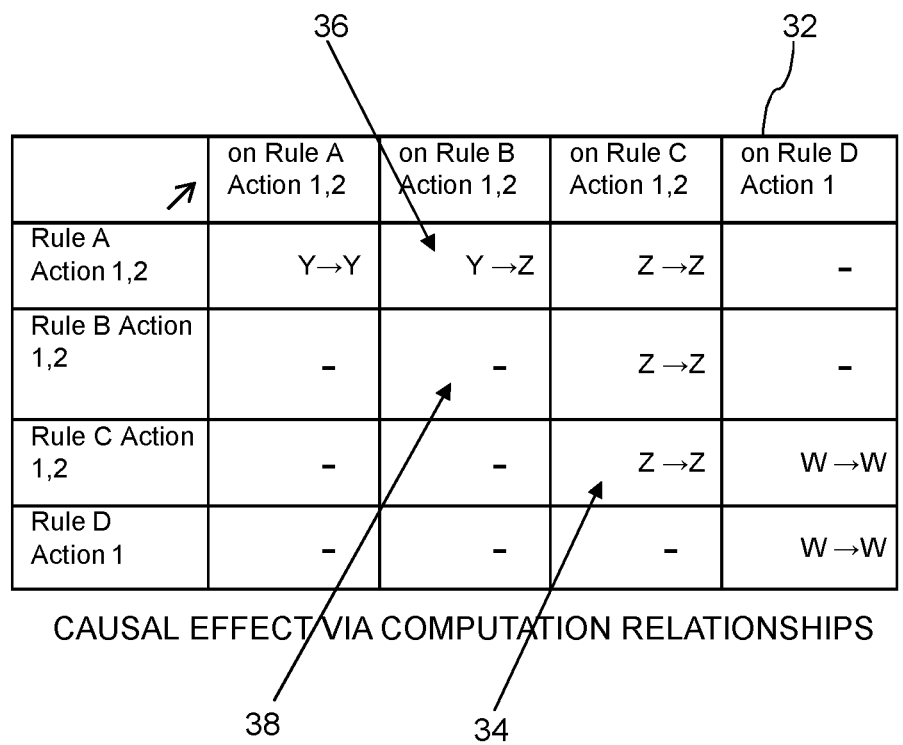
FIG. 5 is a table of computation relationships between the rules of the decision service.

The next sub-stage in the construction of the decision service causal model is to build the causal computation relationships by analysing the rule actions and building computation relationships based on variable modification and utilisation in actions. This can be summarised by the table 32 in FIG. 5, which shows where the actions of specific rules interact with actions of other rules for specific variables.

Considering some of the entries in the causal computation relationships table, there is a causal computation relationship on (RuleC.Action1, RuleC.Action1, Z→Z), labelled 34 in the Figure. For example, if Z=20 and a first instance of rule C is executed, then Z=40 and then if a second instance of the rule is executed then the second output is Z=80. Thus the action Z=Z*2 of the first instance of the rule has an impact on the action Z=Z*2 of the second instance of the rule. After the two instances of rule C there will be Z=(20*2)*2=80 therefore the value of the data has been affected.

There is a causal computation relationship on (RuleA.Action1, RuleB.Action1, Y→Z), labelled 36 in the Figure. Using the same methodology, if Y=10 for example, the final result after the first actions of Rule A and Rule B will be Z=(10+5)+10=25 and therefore the value of the data has been affected. However, there is no causal computation relationship on (RuleB.Action1,RuleB.Action1, Z→Z), labelled 38 in the Figure. Using the same methodology, if Y=10 and Z=5 for example the final result is not affected by the previous instance of Rule B. The result will still be Z=10+10=20 and therefore the value of the data has not been affected.

For this example decision service ruleset, the list of computational relationships is as follows:
(RuleA.Action1,RuleA.Action1,Y→Y);
(RuleA.Action1,RuleB.Action1,Y→Z);
(RuleA.Action1,RuleB.Action2,Y→Z);
(RuleA.Action2,RuleC.Action1,Z→Z);
(RuleB.Action1,RuleC.Action1,Z→Z);
(RuleB.Action2,RuleC.Action1,Z→Z);
(RuleC.Action1,RuleC.Action1,Z→Z);
(RuleC.Action2,RuleD.Action1,W→W);
(RuleD.Action1,RuleD.Action1,W→W);

The final sub-stage of the building of the decision service causal model is the building of the causal intrinsic relationships, which are the relationships already explicitly given by the rules and are useful to connect rules to variables in the causal model. The input for this sub-stage is the ruleset and the aim of this sub-stage is to keep the causal information about intrinsic relationships between rules and parameters. This step is a translation of the decision service logic 14 and the relationships will contain the information that allow the causal model to link rule nodes to variables. This is performed by reading the ruleset with a static analysis and building each causal intrinsic relationship (Rule i, list of parameters evaluated in conditions, list of parameters modified in actions), where the output is a list of the causal intrinsic relationships. For the rules A to D listed above then this sub-stage will output the following list of intrinsic relationships:

(RuleA, Cond.Variables: X, Action1.Variables: Y, Action2.Variables: Z);
(RuleB, Cond.Variables: Y, Action1.Variables: Z, Action2.Variables: Z);
(RuleC, Cond.Variables: Z, Action1.Variables: Z, Action2.Variables: W);
(RuleD, Cond.Variables: Y, Action1.Variables: W);

Each of these seven intrinsic relationships can be represented in the form (Rule ID, Condition ID, <Variables in the condition>, Action ID, <Variables in the action>)

Figure 6:
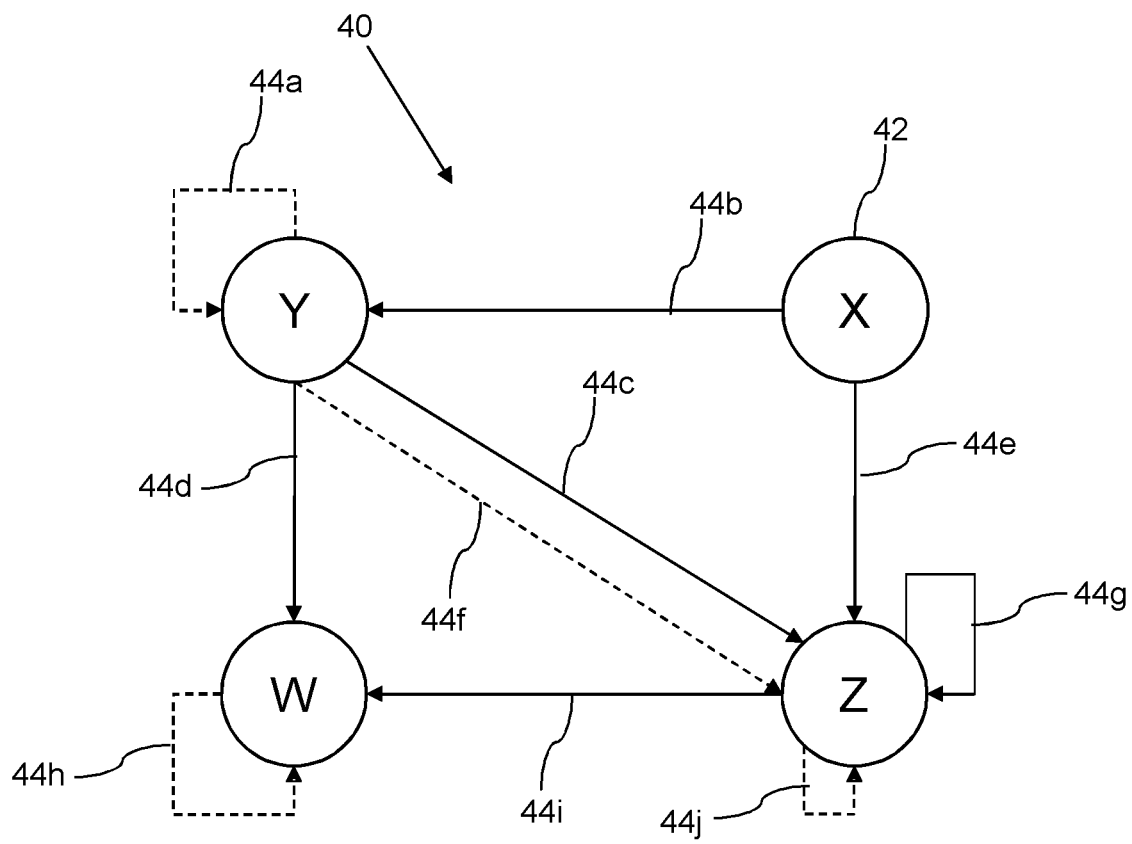
FIG. 6 is a schematic diagram of a data perspective of a causal model of the decision service.

The three sub-stages detailed above have provided the required information necessary to create a causal model of the decision service 10. FIG. 6 shows a first representation of such a model 40. This Figure shows the decision service causal model 40 from a data perspective, with the nodes 42 representing the data used in the decision service 10 (here the variables W, X, Y and Z) and the vertices 44 representing the computation relationships (dashed lines) and the intrinsic relationships (solid lines) that have been identified in the sub-stages detailed above. The vertices 44 illustrated in the Figure correspond to the various relationships within the model 40 according to the table below:

| | |
|---|---|
| 44a | (RuleA.Action1, RuleA.Action1, Y→Y) |
| 44b | (RuleA, Cond1, X, Action1, Y) |
| 44c | (RuleB, Cond1, Y, Action1, Z) |
| | (RuleB, Not(Cond1), Y, Action2, Z) |
| 44d | (RuleD, Cond1, Y, Action1, W) |
| 44e | (RuleA, Cond1, X, Action2, Z) |
| 44f | (RuleA.Action1, RuleB.Action1, Y→Z) |
| | (RuleA.Action1, RuleB.Action2, Y→Z) |
| 44g | (RuleC, Cond1, Z, Action1, Z) |
| 44h | (RuleC.Action2, RuleD.Action1, W→W) |
| | (RuleD.Action1, RuleD.Action1, W→W) |
| 44i | (RuleC, Cond1, Z, Action2, W) |
| 44j | (RuleA.Action2, RuleC.Action1, Z→Z) |
| | (RuleB.Action1, RuleC.Action1, Z→Z) |
| | (RuleB.Action2, RuleC.Action1, Z→Z) |
| | (RuleC.Action1, RuleC.Action1, Z→Z) |

Figure 7:
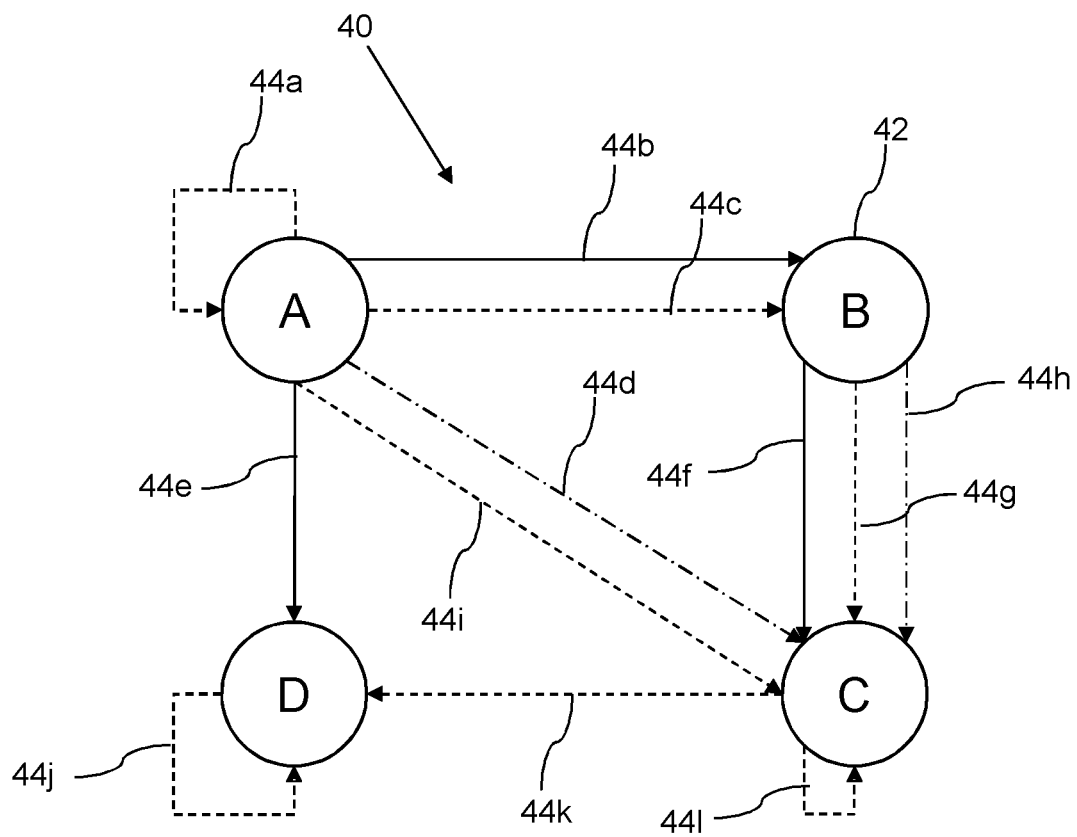
FIG. 7 is a schematic diagram of a rule oriented perspective of the causal model of the decision service.

FIG. 7 shows a second representation of the model 40. This Figure shows the decision service causal model 40 from a rule perspective, with the nodes 42 representing the rules used in the decision service 10 (here the rules A, B, C and D) and the vertices 44 representing the computation relationships (dashed lines), the eligibility relationships (solid lines) and the ineligibility relationships (dot-dashed lines) that have been identified in the sub-stages detailed above. The vertices 44 illustrated in the Figure correspond to the various relationships within the model 40 according to the table below:

| | |
|---|---|
| 44a | (RuleA.Action1, RuleA.Action1.Y→Y) |
| 44b | (RuleA, Action1, RuleB, Condition1, Y) |
| 44c | (RuleA.Action1, RuleB.Action1, Y→Z) |
| | (RuleA.Action1, RuleB.Action2, Y→Z) |
| 44d | (RuleA, Action2, RuleC, Condition1, Z) |
| 44e | (RuleA, Action1, RuleD, Condition1, Y) |
| 44f | (RuleB, Action1, RuleC, Condition1, Z) |
| | (RuleB, Action2, RuleC, Condition1, Z) |
| 44g | (RuleB.Action1, RuleC.Action1, Z→Z) |
| | (RuleB.Action2, RuleC.Action1, Z→Z) |
| 44h | (RuleB, Action2, RuleC, Condition1, Z) |
| 44i | (RuleA.Action2, RuleC.Action1, Z→Z) |
| 44j | (RuleD.Action1, RuleD.Action1, W→W) |
| 44k | (RuleC.Action2, RuleD.Action1, W→W) |
| 44l | (RuleC.Action1.RuleC.Action1, Z→Z) |

The processor 24 must now perform the decision service causal model reduction. The input received in this process is the decision service causal model 40 and the aim of this process is to reduce the decision service causal model 40 to keep only the elements which can have an effect on the output variables 18 of the decision service 10. The processor 24 performs this process by (1) listing the output variables 18 (or a subset of the output variables annotated as explainable) as goals, (2) listing the rules which modify these goals as goals too and (3) deleting elements with no path to any goal. The reduced decision service model is obtained when each element of the model has a path to at least one goal and the output of the process is a reduced decision service causal model.

In the decision service logic 14 detailed above, which comprises the rules A to D and the variables, W, X, Y and Z, then the sole goal of this decision service 10 (when considering the output variables 18 as goals) is the output Z, as this is the sole output 18 of the decision service 10, once the input parameters X, Y and Z have been processed according to the rules A to D. When considering the model 40 shown in FIG. 6 (which is the data perspective of causal model 40) then it can be seen that there is no path from the variable W to the goal Z and thus this node 42 and all of its connected vertices 44 can be deleted.

The next sub-stage is to list the rules that modify the output variables 18 as goals. In the current example decision service logic 14, then the goals will be rules A, B and C as these three rules all modify the output variable Z, but rule D does not have any effect on the output variable Z. Rule D is therefore not a goal in the context of this sub-stage. When considering the model 40 shown in FIG. 7 (which is the rules perspective of causal model 40) then it can be seen that there is no path from the rule D to any goal (rule A, B or C) and thus this node 42 and all of its connected vertices 44 can be deleted.

The processor 24 at this point has now completed the building and reduction of the decision service causal model 40. The purpose of this process is to arrive at a reduced model of the decision service 10 that nevertheless still captures the components within the decision logic 14 that lead to the explainable output 18 of the decision service 10. This is then used to create and deploy a causal probe within the decision service 10. A probe is generated by the processor 24 to be integrated in the decision service 10 to produce causal links whenever the decision service 10 is invoked by the receipt of a query 16. In the example decision service discussed above, rule D, rule C action 2 (since this refers to W only) and parameter W are not instrumented, as these components of the decision logic 14 are not actually required to get to the decision 18.

FIG. 8 shows the operation of the decision service 10 where the decision logic 14 is comprised of the four rules A to D above, in its normal operation. The three input parameters W, X and Y that are passed to the interface 12 within the query 16 for this worked example are W=FALSE, X=TRUE and Y=5. The table 46 of FIG. 8 has three columns, column one (leftmost) showing the cause that triggers subsequent action(s), column two (middle) showing the data effect of the execution of the cause and column three (rightmost) showing the eligibility effect of the execution of the cause, where other rules and/or rule components are added or removed as a result of the data effect of column two. Added means that a rule or rule component is now eligible and remove means that a rule or rule component is now ineligible. The initialisation data from the query 16 in the first instance causes rule A to be executed and also the ELSE portion of rule B (since rule B is an IF THEN ELSE rule triggered from the value of Y) and this therefore forms the next line of the table 46 and so on until all the necessary instances of the rules have been executed according to the eligibility effects of each instance of a rule. In this example the decision engine 56 executes the first eligible rule instance in order of appearance in the ruleset (rule B before rule D). In a different decision engine 56 the order in which eligible rules are executed may differ.

FIG. 9 shows a table 48 that illustrates the operation of the decision service 10 under the same query 16 as that used to generate the table 46 of FIG. 8, but the table 48 is that generated by the instrumentation of the causal probe that is responsible for capturing the reduced causal history of the received query 16. In the table 48 of FIG. 9, only the data effects and eligibility effects of the rules, rule components and variables that actually impact on the output 18 are captured. A comparison of the two tables 46 and 48 will show that rule D and variable W are not instrumented nor is the second action of rule C (which relates to the variable W). FIG. 9 is the data captured by the causal probe as the reduced causal history of a query 16.

Figure 10:
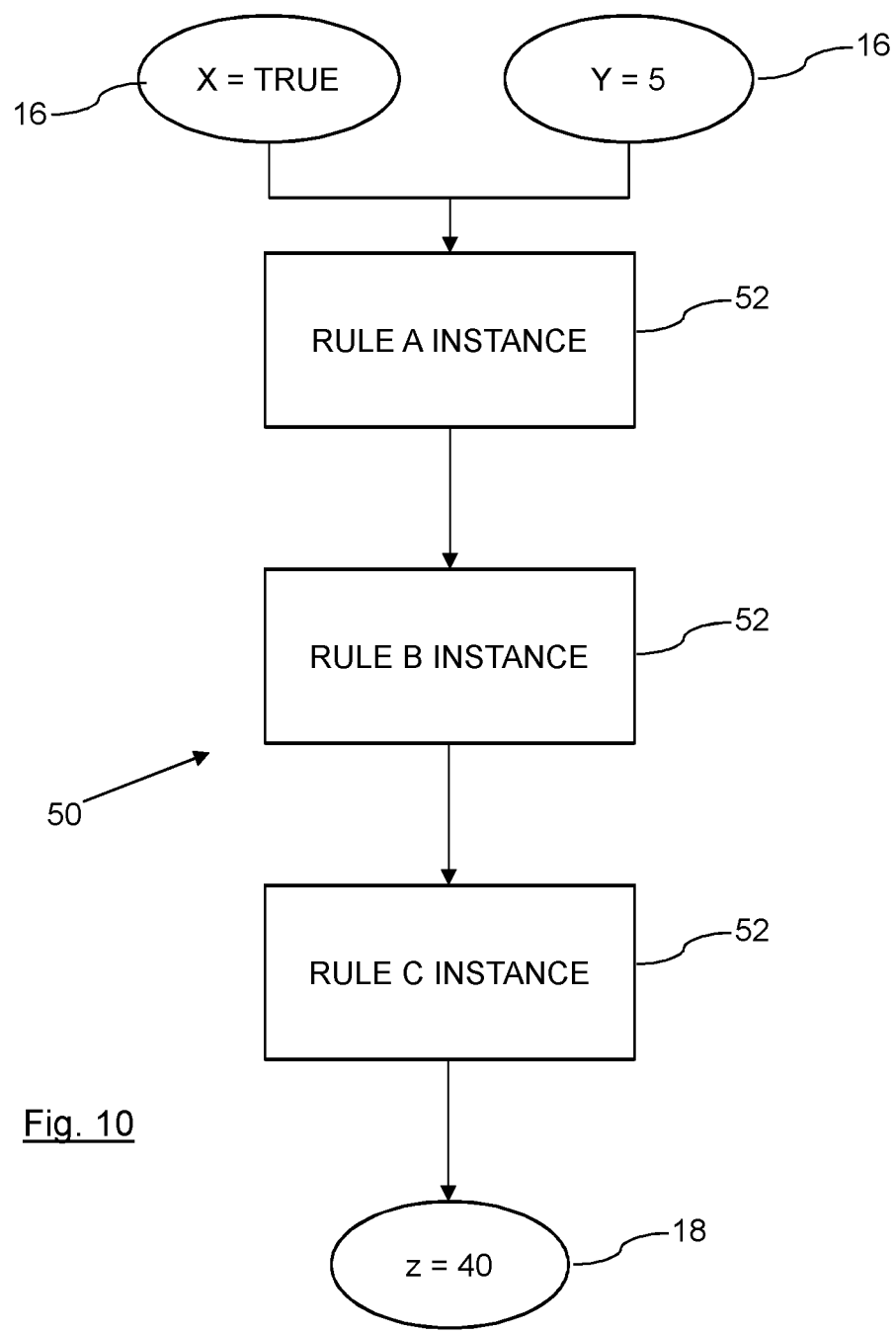
FIG. 10 is a schematic diagram of a causal history of a query to the decision service.

FIG. 10 shows how the causal history 48 that is captured by the causal probe can be represented following the construction of a decision causal model 50 using a backward-chaining approach. The output Z=40 is worked back to the two inputs Y=5 and X=true from the causal history 48, with three instances 52 of rules being present in the model shown in FIG. 10. Working forwards from the first executed rule is rule A, which creates the rule A instance, followed by the rule B instance and finally the rule C instance, which follows the causal history 48 captured in the table 48 of FIG. 9. The causal history 48 of FIG. 9 and the model 50 of FIG. 10 may be made available at the same time that the output 18 is generated, or may be stored for access later.

Figure 11:
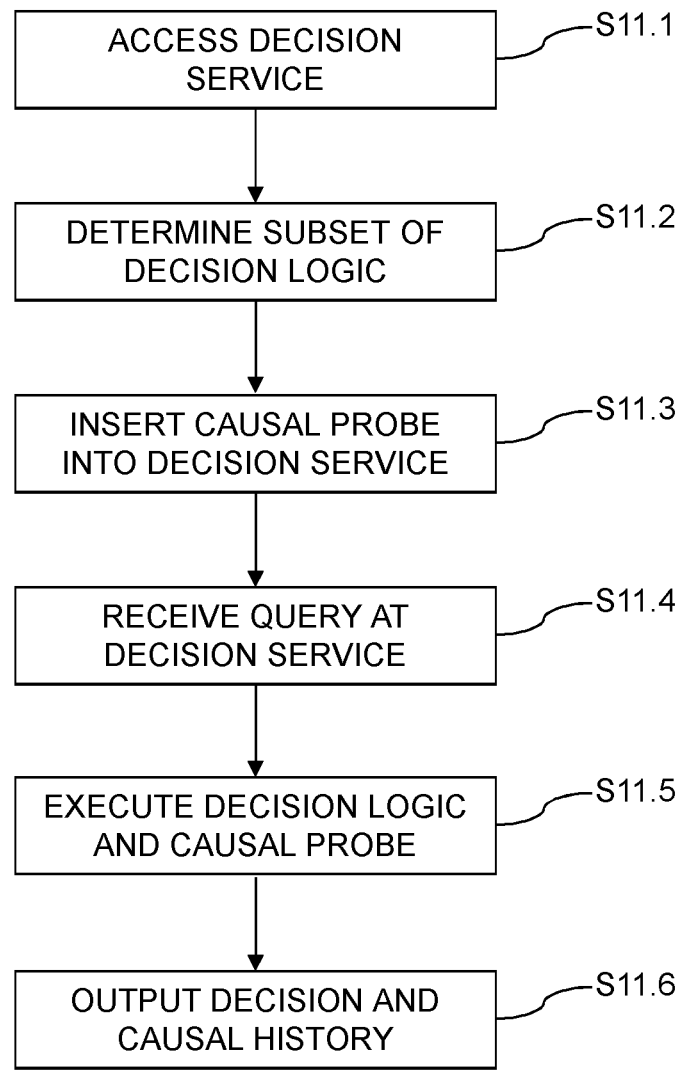
FIG. 11 is a flowchart of a method of operating the decision service.

FIG. 11 summarises the operation of the processor 24 in the authoring, deployment and execution phases of the process. Step S11.1 comprises accessing the decision service 10, the decision service 10 comprising (a) an interface 12 defining one or more inputs and one or more outputs and (b) decision logic 14 comprising a plurality of statements, each statement defining a cause and one or more effects that follow if the cause is satisfied. These statements can be rules that use Boolean logic, as described in the example above, but other structures of the decision logic 14 are also possible.

The next step in the method is step S11.2, which comprises determining a subset of the decision logic 14, the subset comprising only those components of the decision logic 14 required to determine the output(s) 18 for the decision service 10. In this authoring phase, the decision logic 14 is processed to create a reduced set of components which are needed to generate the output 18 from the decision service 10. If the decision logic 14 comprises a set of rules, then this step in the process includes determining only the rules (and only the parts of the rules) that are required to achieve the output 18. This step also comprises determining which parameters are required for the output 18 and therefore removing all components that relate to parameters that are not required for the output 18.

The next step in the method is step S11.3, which comprises inserting a causal probe into the decision service 10, the causal probe comprising recording logic arranged to record a causal history for a query 16 to the decision service 10, the causal history limited to the components of the decision logic 14 forming the subset of the decision logic 14 required to determine the explainable output(s) 18 for the decision service 12. The causal probe can be configured to annotate those parts of the decision logic 14 that are required for the output 18. These annotations specify the data that must be recorded when an annotated component within the decision logic is executed. In general, execution in this context means the creation of an instance of a component (such as a rule) within the decision logic 14. The same component (be it a rule or a part of a rule) could be executed multiple times in the operation of the decision logic 14, each execution creating a new instance of the rule or component being executed.

The next step of the method is step S11.4, which comprises receiving a query 16 at the interface 12 of the decision service 10, the query 16 defining the one or more inputs for the decision service 10. At this point a query 16 is received by the decision service 10, in its normal operation, the query 16 requiring a decision 18 from the decision service 10. The next step is step S11.5, which comprises executing the decision logic 14 to determine the one or more outputs 18 for the decision service 10 for the received query 16, the execution including executing the causal probe to determine the causal history for the received query 16. The decision logic 14 executes as normal to produce the decision 18 required by the query 16 and the instrumented components within the decision logic 14 at the same time produce the causal history for the query 16.

The final step in the method is step S11.6, which comprises outputting the one or more outputs 18 and the causal history from the decision service 10 for the received query 16. The decision 18 is returned to the source of the query 16 and the causal history is stored either locally with the computer system 20 or at a suitable remote storage location. The causal history is stored with a suitable identification element that connects the causal history to the specific query 16, so that the causal history can be recalled if it is needed. The causal history may in fact never be accessed, but the purpose of the causal probe is to generate the specific causal history for the query 16, so that the causal history is available via the identification element at some time in the future.

Figure 12:
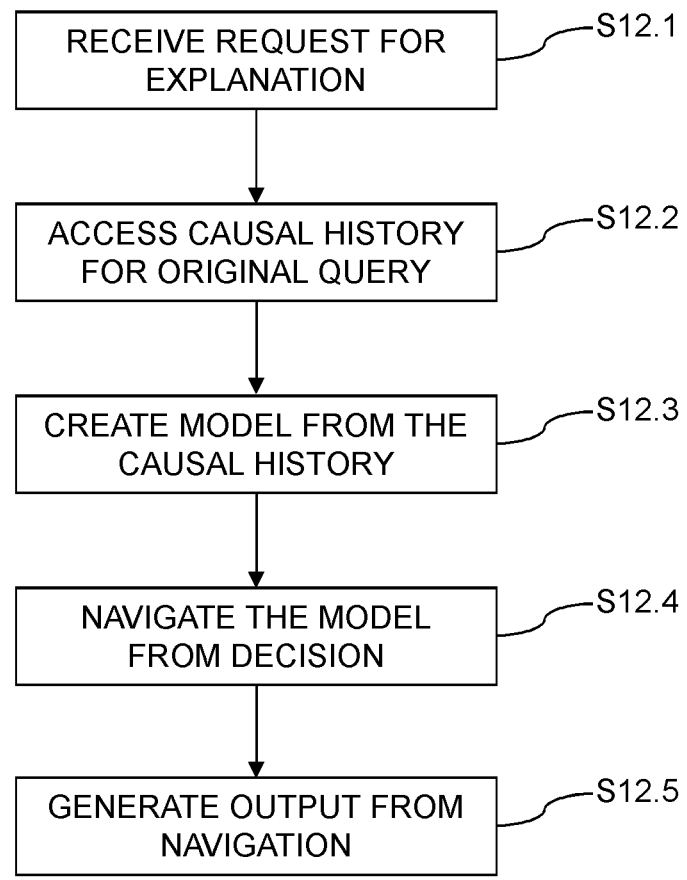
FIG. 12 is a flowchart of a method of post-processing a decision of the decision service.

FIG. 12 shows a flowchart that corresponds to the post-processing part of the operation of the decision service 10. The first step here is the step S12.1, which comprises receiving a request for an explanation for an output 18 from the decision service 10 for the received query 16. The request for an explanation can be received at any time after the decision 18 was generated in response to the initial query 16, since the causal history is stored for later recall at any time. The next step in the method comprises step S12.2, which comprises accessing the causal history from the decision service 10 for the received query 16. In this step, the computer system 20 recalls the stored causal history for the specific query 16, using the identification element for that specific causal history, which links the original query 16 and decision 18 to the stored causal history.

The next steps in the method are step S12.3, which comprises creating a decision causal model for the accessed causal history, and step S12.4, which comprises navigating the decision causal model from the output 18 from the decision service 10 for which an explanation has been requested to the one or more inputs defined in the respective query 16. As described above, the stored causal history can be used to generate a decision causal model using backward-chaining that contains the instances of the rules that have been created during the operation of the decision logic 14 (in response to the specific query 16) and shows the data and eligibility trail between the various instances of the rules.

The final step in the method is step S12.5, which comprises generating an explanation output from the navigation of the decision causal model from the output from the decision service for which an explanation has been requested to the one or more inputs defined in the respective query. An explanation is outputted that has been generated by the processor 24 of the computer system 20 that is derived from the decision causal model. This explanation can be presented on the display device 22, so that a suitable user can access and navigate that explanation.

The system 20 enables the building of a minimal causal history by instrumenting and tracing useful information driven by the decision outcome. This minimal causal history can be used instead of a full history to reduce the extra cost at runtime and the size in memory. The minimisation of the history is based on causality. The idea behind the minimisation is to analyze the rules and parameters of the decision service 10 to deduce a causal model of the decision service 10 and then reducing this causal model by filtering out the parameters and rules which are not connected to any output parameter. This reduced causal model is the key to constructing the minimal causal history. The system 20 provides the necessary material to produce clearer explanations. After runtime a causal model of the decision 18 is built based on the minimal causal history and the reduced causal model of the decision service 10. The causal model of the decision 18 can be constructed as a graph which provides information about the components needed to deduce the output parameters and the causal links between these components. Using this decision causal model as material for an explanation system allows the production of an explanation without unnecessary noise. The system 20 reduces any extra cost of development maintenance and provides a generic method which is independent of the decision service 10 and allows the automatic construction of a causal model. If there are any changes to the decision service 10, the causal model will be automatically updated by changing only the causal relationships linked to the modified elements and there will not be any extra cost of maintenance. The storage of the causal history for a decision that has been made will also store version information relative to the current version of the decision service 10. This will allow an explanation to be generated that can be understood in the context of the state of the decision logic 14 at the time that the original query was passed to the decision service 10.

Figure 13:
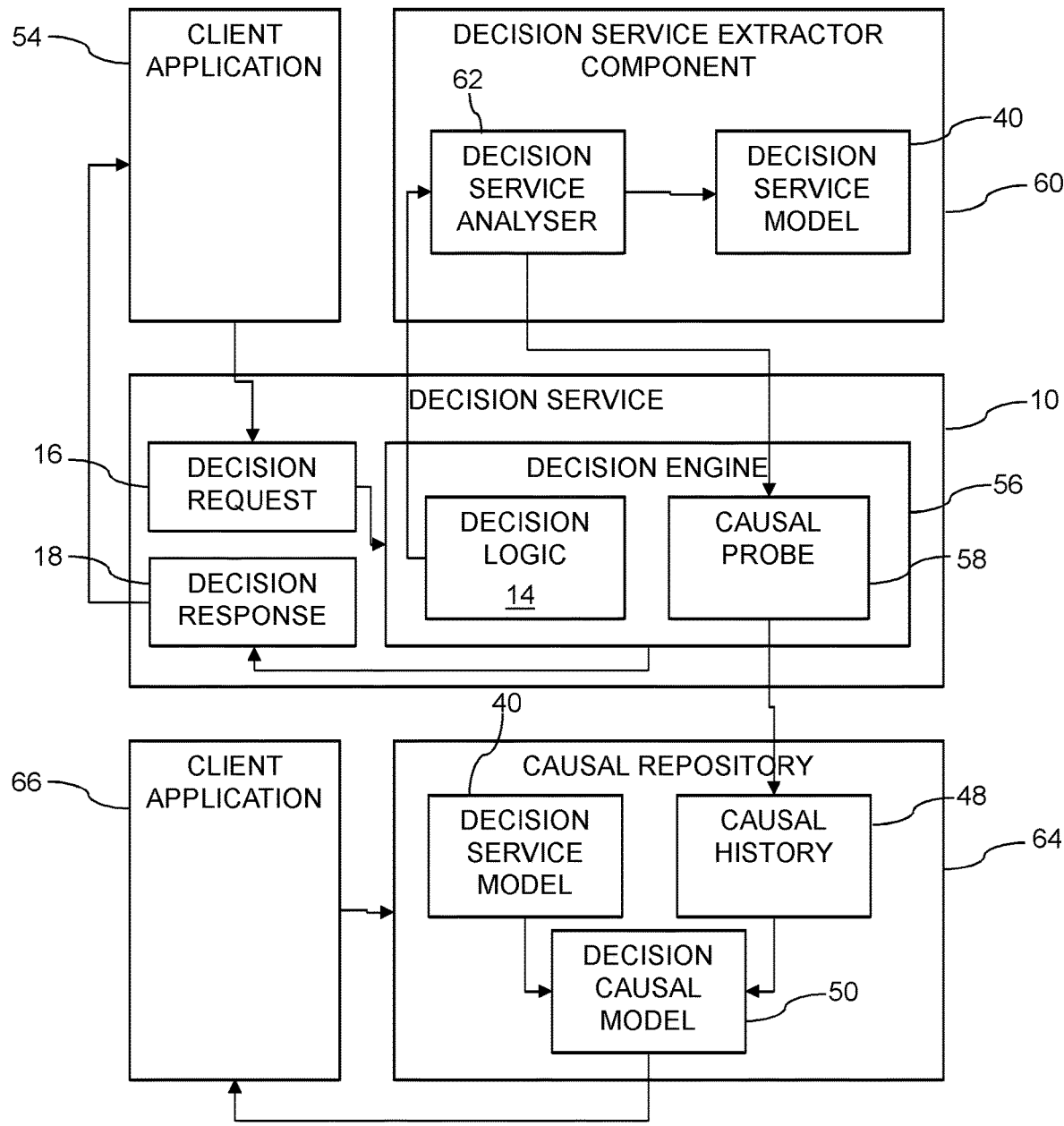
FIG. 13 is a further schematic diagram of a decision service.

A more detailed representation of the decision service 10 is shown in FIG. 13. A client application 54 submits a decision request 16 to the decision service 10. The decision service 10 comprises a decision engine 56 which receives the decision request 16. The decision engine 56 comprises the decision logic 14 and the causal probe 58. A decision service extractor component 60 comprises a decision service analyser 62 which performs the static analysis of the decision logic 14 to produce the decision service model 40, which is stored in a minimised form. This is used to create the causal probe 58, which is inserted into the decision service 56. The decision request 16 is processed by the decision logic 14 and a decision response 18 is generated that is returned to the client application 54. At the same time, the causal probe 58 generates the reduced causal history 48 which is passed to a causal repository 64. The causal repository 64 is accessed by a different client application 66 to seek an explanation of the original decision 18. The causal repository 64 uses the causal history 48 in combination with the decision service model 40 is able to generate a decision causal model 50 which is used to provide an explanation to the client application 66.

Figure 14:
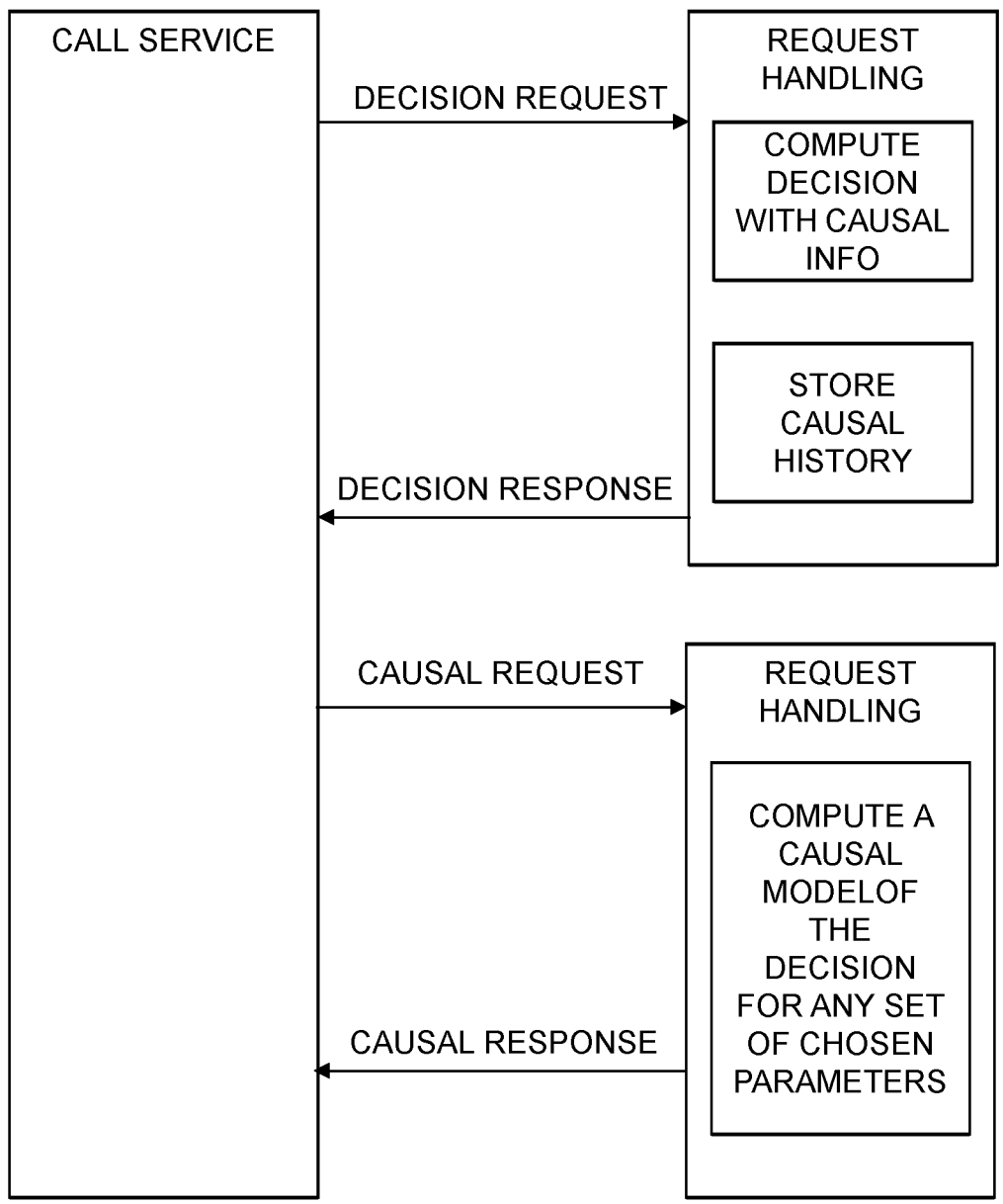
FIG. 14 is a schematic diagram of a message sequence showing request and response protocols relating to a decision and a causal model.

FIG. 14 shows a sequence of messages between a decision client (left-hand side) and a decision server (right-hand side). Firstly, a decision request is sent from a client to the decision server which results in the computation of the decision with the causal information and the storage of the causal history. A decision response is sent from the decision server to the client. At a later time, a causal request is received and this results in the computation of a causal model of the original decision and the generation of an explanation that is returned to the requesting client.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method comprising:
   accessing a decision service, the decision service comprising (a) an interface defining one or more inputs and one or more outputs and (b) decision logic comprising a plurality of statements, each statement defining a cause and one or more effects that follow if the cause is satisfied;
   determining a subset of the decision logic, the subset comprising only those components of the decision logic required to determine the output for the decision service;
   inserting a causal probe into the decision service, the causal probe comprising recording logic arranged to record a causal history for a query to the decision service, the causal history limited to only the particular components of the decision logic forming the particular subset of the decision logic required to determine the particular output for the decision service;
   receiving a query at the interface of the decision service, the query defining the one or more inputs for the decision service;
   creating a causal model of the decision logic based on the causal history using backward chaining;
   executing the decision logic to determine the one or more outputs for the decision service for the received query, the executing including executing the causal probe to determine the causal history for the received query; and
   outputting the one or more outputs and the causal history from the decision service for the received query.

2. The method according to claim 1, wherein the determining of a subset of the decision logic further comprises:
   removing data relationships from the causal model where such data relationships do not affect any output of the decision service;
   removing conditional relationships from the causal model where such conditional relationships do not affect any output of the decision service; and
   determining the subset of the decision logic from the reduced causal model.

3. The method according to claim 1, wherein the inserting of a causal probe into the decision service further comprises:
   annotating those components of the decision logic forming the subset of the decision logic required to determine the output for the decision service with recording logic arranged to generate a causal history when a respective component of the decision logic is executed.

4. The method according to claim 1, further comprising:
   receiving a request for an explanation for an output from the decision service for the received query;
   accessing the causal history from the decision service for the received query;
   creating a decision causal model for the accessed causal history;
   navigating the decision causal model from the output from the decision service for which an explanation has been requested to the one or more inputs defined in the respective query; and
   generating an explanation output from the navigation of the decision causal model from the output from the decision service for which an explanation has been requested to the one or more inputs defined in the respective query.

5. The method according to claim 1, wherein the decision logic comprises a plurality of rules, each rule constructed using Boolean logic and operating on one or more variables defined by the inputs of the interface and wherein the determining of a subset of the decision logic, the subset comprising only those components of the decision logic required to determine the output for the decision service comprises removing those rules, rule parts and variables that are not required to determine the output of the decision service.

6. A computer system comprising a processor arranged to:
access a decision service, the decision service comprising (a) an interface defining one or more inputs and one or more outputs and (b) decision logic comprising a plurality of statements, each statement defining a cause and one or more effects that follow if the cause is satisfied;
determine a subset of the decision logic, the subset comprising only those components of the decision logic required to determine the output for the decision service;
insert a causal probe into the decision service, the causal probe comprising recording logic arranged to record a causal history for a query to the decision service, the causal history limited to only the particular components of the decision logic forming the particular subset of the decision logic required to determine the particular output for the decision service;
receive a query at the interface of the decision service, the query defining the one or more inputs for the decision service;
create a causal model of the decision logic based on the causal history using backward chaining;
execute the decision logic to determine the one or more outputs for the decision service for the received query, the executing including executing the causal probe to determine the causal history for the received query; and
output the one or more outputs and the causal history from the decision service for the received query.

7. The system according to claim 6, wherein the processor is arranged, when determining a subset of the decision logic, the subset comprising only those components of the decision logic required to determine the output for the decision service, to:
remove data relationships from the causal model where such data relationships do not affect any output of the decision service;
remove conditional relationships from the causal model where such conditional relationships do not affect any output of the decision service; and
determine the subset of the decision logic from the reduced causal model.

8. The system according to claim 6, wherein the processor is arranged, when inserting a causal probe into the decision service, to:
annotate those components of the decision logic forming the subset of the decision logic required to determine the output for the decision service with recording logic arranged to generate a causal history when a respective component of the decision logic is executed.

9. The system according to claim 6, wherein the processor is further arranged to:
receive a request for an explanation for an output from the decision service for the received query;
access the causal history from the decision service for the received query;
create a decision causal model for the accessed causal history;
navigate the decision causal model from the output from the decision service for which an explanation has been requested to the one or more inputs defined in the respective query; and
generate an explanation output from the navigation of the decision causal model from the output from the decision service for which an explanation has been requested to the one or more inputs defined in the respective query.

10. The system according to claim 6, wherein the decision logic comprises a plurality of rules, each rule constructed using Boolean logic and operating on one or more variables defined by the inputs of the interface and wherein processor is arranged, when determining a subset of the decision logic, the subset comprising only those components of the decision logic required to determine the output for the decision service, to remove those rules, rule parts and variables that are not required to determine the output of the decision service.

11. A computer program product for controlling a system, the computer program product comprising a computer readable storage medium having program instructions embodied therewith, the program instructions executable by a processor to cause the processor to:
access a decision service, the decision service comprising (a) an interface defining one or more inputs and one or more outputs and (b) decision logic comprising a plurality of statements, each statement defining a cause and one or more effects that follow if the cause is satisfied;
determine a subset of the decision logic, the subset comprising only those components of the decision logic required to determine the output for the decision service;
insert a causal probe into the decision service, the causal probe comprising recording logic arranged to record a causal history for a query to the decision service, the causal history limited to only the particular components of the decision logic forming the particular subset of the decision logic required to determine the particular output for the decision service;
receive a query at the interface of the decision service, the query defining the one or more inputs for the decision service;
creating a causal model of the decision logic based on the causal history using backward chaining;
execute the decision logic to determine the one or more outputs for the decision service for the received query, the executing including executing the causal probe to determine the causal history for the received query; and
output the one or more outputs and the causal history from the decision service for the received query.

12. The computer program product according to claim 11, wherein the instructions for determining a subset of the decision logic comprise instructions for:
removing data relationships from the causal model where such data relationships do not affect any output of the decision service;
removing conditional relationships from the causal model where such conditional relationships do not affect any output of the decision service; and
determining the subset of the decision logic from the reduced causal model.

13. The computer program product according to claim 11, wherein the instructions for inserting a causal probe into the decision service comprise instructions for annotating those components of the decision logic forming the subset of the decision logic required to determine the output for the decision service with recording logic arranged to generate a causal history when a respective component of the decision logic is executed.

14. The computer program product according to claim 11, further comprising instructions for:
  receiving a request for an explanation for an output from the decision service for the received query;
  accessing the causal history from the decision service for the received query;
  creating a decision causal model for the accessed causal history;
  navigating the decision causal model from the output from the decision service for which an explanation has been requested to the one or more inputs defined in the respective query; and
  generating an explanation output from the navigation of the decision causal model from the output from the decision service for which an explanation has been requested to the one or more inputs defined in the respective query.

15. The computer program product according to claim 11, wherein the decision logic comprises a plurality of rules, each rule constructed using Boolean logic and operating on one or more variables defined by the inputs of the interface and wherein the instructions for determining a subset of the decision logic, the subset comprising only those components of the decision logic required to determine the output for the decision service comprise instructions for removing those rules, rule parts and variables that are not required to determine the output of the decision service.

* * * * *